United States Patent [19]

Patterson, III

[11] 4,199,806

[45] Apr. 22, 1980

[54] CMOS VOLTAGE MULTIPLIER

[75] Inventor: Raymond B. Patterson, III, Melbourne, Fla.

[73] Assignee: Harris Corporation, Melbourne, Fla.

[21] Appl. No.: 870,549

[22] Filed: Jan. 18, 1978

[51] Int. Cl.² .......................................... H02M 7/00
[52] U.S. Cl. ...................................................... 363/60
[58] Field of Search ..................................... 363/59, 60

[56] References Cited

U.S. PATENT DOCUMENTS

| | | | |
|---|---|---|---|
| 3,824,447 | 7/1974 | Kuwabara | 363/60 |
| 3,975,671 | 8/1976 | Stoll | 363/60 |
| 4,000,412 | 12/1976 | Rosenthal et al. | 307/208 |
| 4,053,821 | 10/1977 | Hose, Jr. et al. | 363/60 |
| 4,068,295 | 1/1978 | Portmann | 363/60 |
| 4,106,086 | 8/1978 | Holbrook et al. | 363/60 |

Primary Examiner—William M. Shoop
Attorney, Agent, or Firm—Leitner, Palan, Martin & Bernstein

[57] ABSTRACT

A CMOS voltage multiplier circuit comprised of one or more multiplier cells each of said cells including two P-channel devices functioning as switching elements to connect a cell contained capacitance in parallel across a voltage supply during one half of a cycle and a single N-channel device for connecting the capacitance in series with the supply during the other half of the cycle. An output stage is provided which includes a transfer device and a modified multiplier cell for driving the transfer device.

9 Claims, 2 Drawing Figures

CMOS VOLTAGE MULTIPLIER

BACKGROUND OF THE INVENTION

The need for voltage multipliers is well recognized in various fields of electronics. In digital watch technology, for example, economic and physical constraints associated with watch design limit the size of the battery which can be retained within the watch. The battery is used to power the watch circuitry as well as the display devices. Generally, a 1.5 volt battery is used. However, higher voltages are required to drive the display devices. For example, potentials of 4 volts and up are needed to drive display devices such as liquid crystal displays. Various circuits have been designed for digital watch use to provide this required higher voltage. Prior art voltage multiplying circuits employ resistors, diodes, inductors and bipolar transistors in resonant transfer circuits. A difficulty with the use of such elements in digital watches is that these elements cannot be intergrated into CMOS circuitry which is generally used in the remainder of the watch circuitry. In addition, these components are relatively expensive when compared with the remainder of the watch electronics.

An improved type of voltage multiplier makes use of a circuit which functions to charge a capacitor and then to connect the capacitor in series with a potential source such as the watch battery to effect voltage multiplication. In such a circuit, voltage multiplication occurs because the potential across a capacitor connected in series with another potential source adds to the potential of the other potential source to thereby increase the output potential of the circuit beyond the potential of the source. It is also known to use several capacitors and transistor switching devices which operate to initially connect the capacitors in parallel to charge them to some value and thereafter change the circuit connection such that the capacitors are connected in series with a potential source to cause the potential stored on the several capacitors to add with the potential produced by the source to develop a higher output potential than that developed by the source itself. When the capacitors are connected in parallel they can charge to essentially the source potential. Thus, the series connected circuit comprised of the source itself and the capacitors will produce an output voltage which is a multiple of the source potential. If two capacitors are used, then a voltage tripler will be developed.

Voltage multipliers of the capacitance type just described are disclosed in U.S. Pat. No. 3,824,447 issued July 16, 1974 to Kuwabara and U.S. Pat. No. 3,975,671 issued Aug. 17, 1976 to Stoll. While these devices present a significant improvement in voltage multiplier circuits for use with digital watches, they suffer certain significant disadvantages. Kuwabara teaches two multiplier designs. In a first design, he makes use of MOS FETs of the same conductivity type. Such a design is not compatible with CMOS devices which are generally used in the remainder of the watch electronics. A further disadvantage of the single conductivity type FET multiplier circuit of Kuwabara involves the fact that it requires gate drive voltages outside the range of the multiplied output voltage if enhancement mode devices are used, or a different set of logic level voltages if depletion mode devices are used. In a second embodiment of the Kuwabara patent, a voltage multiplier using CMOS devices is described. Such a circuit would be compatible with the remainder of the watch electronics; however, the multiplier design requires the use of diodes. A difficulty with this circuit arises because of its use of diodes in the parallel charging path. These will exhibit a forward biased voltage drop on the order of one-half volt. Assuming a 1.5 volt battery, the forward biased voltage drop would amount to one-third of the supply voltage. A still further difficulty with this circuit design involves the fact that no diode with both anode and cathode free of the substrate or not part of a parasitic bipolar transistor is available in ordinary junction isolated CMOS process technology.

The Stoll patent describes a voltage multiplier using CMOS technology. The Stoll design requires that N-channel devices be used to connect the voltage storage capacitors to the negative side of the power supply during the parallel charging part of a cycle of operation. As a result, in order to insure that the body-drain junction does not become forward biased during a negative excursion of the side of the capacitor to which it is connected, the body must be tied to drain. This raises the possibility that, during parallel charging, the body-source junction could become forward biased. If this should happen, a parasitic transistor (consisting of the N substrate which is tied to the positive side of the power supply for a collector, the P well for a base and the N+ source, which is tied to the negative side of the power supply for an emitter) will be turned on and a large spike of current will be drawn from the power supply. If the instantaneous value of this spike is high enough to produce a local voltage drop in the N substrate that is sufficient to forward bias a P-channel source substrate junction, a thyristor section can result. This is a self-sustaining phenomenon and will continue until the power supply voltage drops below the level required to sustain it. A still further disadvantage with the Stoll design involves the use of a clamp circuit to connect the disclosed level shifer to the negative side of the power supply during start up.

Thus there exists a need for a CMOS, capacitance type voltage multiplier which overcomes the disadvantages of the prior art.

SUMMARY OF THE INVENTION

The present invention is a voltage multiplier comprising storage capacitors interconnected through switching elements to effect parallel charging of the capacitors during a first half of a cycle and serial connection of the capacitor with a potential source, such as a 1.5 volt battery, during the later half of the cycle to develop voltage multiplication. The voltage multiplier includes four functional sections, an inverter buffer stage, a level shifter stage, multiplier cells and an output stage. One or more multliplier cells are used depending upon the desired multiplication factor. Each cell is comprised of CMOS devices and a capacitor. Specifically, two devices of one conductivity type and one device of a second conductivity type are used. Where a negative output voltage relative to ground is desired, two P-channel devices connected in series with the voltage storage capacitor are provided in the cell for parallel charging while a single N-channel device operates to selectively connect the cell capacitor in series with a potential source be it the battery or another capacitor of a preceding or following cell. Using a P-channel device to connect the capacitor to the negative side of the power supply eliminates current spike problems and introduces less parasitic capacitance to the substrate.

Such parasitic capacitance acts to reduce the efficiency of the multiplier.

The inverter buffer stage consisting of CMOS devices functions to buffer the input waveform which can be derived from a watch counter string. The input waveform is preferably a square wave. The level shifter functions to clamp the output from the buffer stage to a selected level. The output stage provides a voltage holding capacitor, the potential across which might be used to drive the liquid crystal display of a watch. The output stage makes use of a P-channel device as a transfer switch to connect the output from the last multiplier cell to the voltage holding capacitor. The P-channel device is driven by an auxiliary multiplier cell specifically constructed to function in the output stage. This cell differs from the multiplier cells used in the multiplier section in that the size of the capacitor in the auxiliary multiplier cell is selected to be many times smaller than that used in the basic multiplier cell thus allowing the capacitor to be conveniently built on the chip itself using conventional CMOS technology.

OBJECTS OF THE INVENTION

An object of the present invention is to provide a capacitor-type multiplier using CMOS technology.

Another object of the present invention is to provide a capacitor-type multiplier capable of operating with the limited voltage power supply of a watch.

Still another object of the present invention is to provide a capacitor-type multiplier capable of implementation in junction isolated CMOS intergrated circuits.

Other objects, advantages, and novel features of the invention will become apparent from the following detailed description of the invention when considered in conjunction with the accompanying drawings.

DESCRIPTION OF THE PREFERRED EMBODIMENTS

Figure 1:
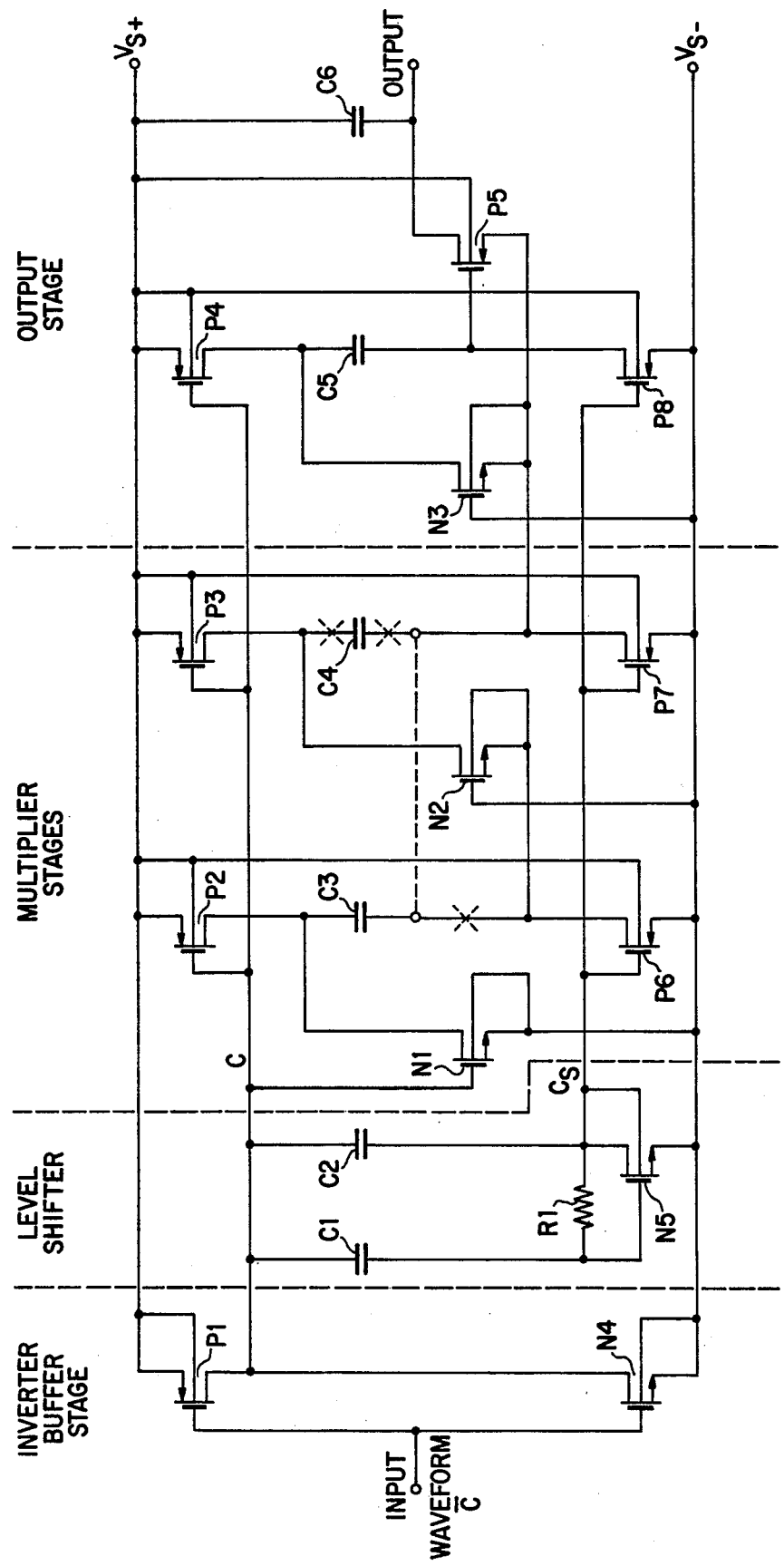
FIG. 1 is a schematic diagram of a voltage multiplier circuit incorporating the principles of the invention.

FIG. 1 illustrates a preferred embodiment of a voltage multiplier circuit embodying the features of the present invention which includes four functional stages, namely, an inverter buffer stage, a level shifter stage, multiplier cell stages and an output stage.

Although not so limited, for the sake of explanation, the circuit of the invention will be described in relation to digital watches. In such watches a single 1.5 volt battery is used to supply a reference supply voltage $V_S$. Conventionally, the battery is connected to a watch counter string to generate a square wave output voltage which will be taken as the input to the voltage multiplier circuit of the invention. This square wave signal may be of a frequency of 512 hertz and of an amplitude of 1.5 volts peak to peak.

The input square wave signal is applied to the inverter buffer stage of the voltage multiplier. This first section consists of a CMOS inverter comprised of a P-channel device P1 and an N-channel device N4. The inverter stage functions to buffer and shape the input square wave from the counter string. In the inverter buffer stage illustrated in FIG. 1, the gates of devices P1 and N4 are tied together to receive the input square wave. The source of device P1 is connected to the positive reference terminal $V_{S+}$ with the source of the device N4 connected to the negative reference potential $V_{S-}$. In the embodiment illustrated, $V_{S+}$ is taken as ground potential with $V_{S-}$ assuming a value of $-1.5$ volts. The drains of the inverter devices P1, N4 are tied together to form the inverter output.

The inverter output is connected to a level shifter. The level shifter constitutes a voltage clamp which references one side of the 1.5 volt peak to peak square wave to $-1.5$ volts so that the square wave applied to the gates of the devices P6, P7 and P8, described in greater detail hereinbelow, swings between $-1.5$ volts and $-3.0$ volts. The level shifter illustrated in FIG. 1 is comprised of capacitors C1 and C2 which capacitors are small relative to the value of the capacitors C3 and C4 forming a portion of the multiplier cells and can be formed on the chip itself. As will be described hereinafter, the multiplier cell capacitors C3 and C4 as well as the holding capacitor C6 are large capacitors which are external to the integrated circuit forming the balance of the voltage multiplier whereas auxillary capacitor C5 is relatively small and may be intergrated in the circuit as are C1 and C2. One terminal of each of the capacitors C1 and C2 are tied together and connectd to the output from the inverter stage. The other terminal of the capacitor C1 is connected to a node to which is also connected one terminal of resistor R1 and the gate of the N-channel device N5. The other terminal of the capacitor C2 is connected to node common to the other terminal of the resistor R1 and the drain of the device N5. The source of the device N5 is connected to the negative reference level $V_{S-}$.

The capacitor C2 is manufactured to be x times larger than the capacitor C1, with x being greater than 5 but less than 10. The output from the inverter is a square wave which alternates between the voltage level $V_{S+}$ and the level $V_{S+} - V_S$. With $V_S$ taken as 1.5 volts, the value $V_{S+}$ is ground potential or zero volts and the level $V_{S+} - V_S$ becomes equal to $-1.5$ volts. The level shifter functions to translate the square wave output from the inverter buffer stage to a level alternating between $V_{S+} - V_S$ and the level $V_{S+} - 2V_S$. Thus, with $V_S$ set equal to 1.5 volts, the output from the level shifter is a square which swings between $-1.5$ volts and $-3.0$ volts.

The level shifter just described operates quite adequately in most situations. However, proper operation of the level shifter depends on the leakage current flowing into the resistor R1 and the body of the device N5 across their isolation junctions. This leakage current tends to pull the output of the level shifter in a positive direction. This means that on positive excursions of the square wave, the body of the device N5 becomes slightly foward biased which reduces the threshold voltage of this device. If the gate-source voltage, $V_{GS}$, of N5 exceeds the reduced threshold voltage at the end of a positive going transition, then the device N5 will turn on and replace the charge removed from the capacitance C2 by the leakage current. The charging time is determined by the time constant of the circuit comprised of the capacitor C1 and the resistor R1. This time constant is small relative to a half cycle of a 512 hertz square wave. Since the capacitor C2 is considerably larger than the capacitor C1, the loss of charge to equalize their voltages after the device N5 cuts off is small so that the net voltage change is small and the level shifter output is restored to normal. Since leakage and threshold voltage are subject to variation, the operation of the level shifter is thus also subject to some variation. Thus, depending upon the value of the leakage current and the threshold voltage, the capacitor C2 does not necessarily recharge every cycle or every other cycle but only when leakage discharges the capacitors C2 and C1 to point where the device N5 turns on.

The third section of the device is comprised of multiplier cells. The number of cells used will depend upon the required multiplication factor. FIG. 1 illustrates a multiplier according to the present invention utilizing two multiplier cells. This arrangement provides for a voltage tripler. Should only one cell be utilized, then a voltage doubler would be realized. As will be explained hereinafter, each cell provides a voltage equal to the reference supply voltage level $V_S$ and thus a single cell, when combined with the potential of the supply voltage, produces an output voltage equal to twice the voltage of the supply voltage while the use of two cells produces an output voltage, when combined with the reference voltage from the reference voltage source, three times that of the reference source.

The voltage multiplier cells use CMOS technology. These cells are comprised of N-channel and P-channel devices as well as a capacitor. Due to the size of the capacitor needed to effect the voltage multiplication, they are provided external to the multiplier circuit chip. The N and P-channel devices function as switching elements to place the cell capacitor in parallel with the reference source during the first half of a cycle thereby allowing the capacitor in series with the reference source during the second half of the cycle to effect voltage multiplication. In the cell of the present invention, two P-channel devices are serially connected with the cell capacitor and function to connect the capacitor in parallel with the reference source. A single N-channel device is provided to serially connect the capacitor with the reference source. Thus, during the first half of a cycle, the P-channel devices are conducting and the N-channel device is off allowing a voltage to accumulate on the capacitor. During the second half of the cycle, the N-channel device is conducting and the P-channel devices are turned off thereby placing the capacitor in series with the reference source.

As shown in FIG. 1, the source of the P-channel device P2 is connected to the positive reference level $V_{S+}$ while the source of the device P6 is connected to the negative reference level $V_{S-}$. The drains of the devices P2 and P6 are each connected to opposite terminals of the cell capacitor C3. The gates of devices P2 and P6 are connected to the level shifter as is the gate of the N-channel device N1. The source-drain circuit of the device N1 is connected between the more positive terminal of the capacitor C3 and the negative reference level $V_{S-}$.

The interconnection of elements in the second multiplier cell which include devices P3, P7 and N2 and capacitor C4 is essentially identical to that of the first multiplier cell with some modification. Specifically, the gate of the N-channel device N2 is connected to the negative reference level $V_{S-}$ with its source being connected to the node common with the drain of the device P6 and the more negative terminal of the cell capacitor C3.

Operation of the multiplier cell will now be described. On one half cycle of the input square wave, capacitor C3 is charged to 1.5 volts through the devices P2 and P6. The capacitor C4 is also charged to 1.5 volts through the devices P3 and P7. As will be further explained hereinafter, the capacitor C5 of the auxiliary multiplier stage forming a portion of the output stage is also charged to 1.5 volts through the devices P4 and P8. Since the P-channel devices P6, P7 and P8 are all turned on during this half cycle, the N-channel devices N2, N3 and the P-channel device P5 have no gate-source voltage applied to them and they will therefore be turned off. During the next half cycle, the P-channel devices P2, P3, P4, P6, P7, and P8 will be turned off. The N-channel device N1 is turned on and drives the positive side of the cell capacitor C3 to $-V_S$ which will be assumed to be $-1.5$ volts. This puts the negative side of the capacitor C3 at $-3.0$ volts causing the N-channel device N2 to turn on driving the positive side of the capacitor C4 to $-3.0$ volts. This puts the negative side of the capacitor C4 at $-4.5$ volts and the N-channel device N3 will turn on driving the negative side of the capacitor C5 to $-6.0$ volts. This provides gate drive voltage to the transfer device P5 turning it on and permitting charge to be transferred into the holding capacitor C6 on successive cycles until the capacitance C6 is charged to $-4.5$ volts.

Operation of the device as a voltage doubler is quite similar. Voltage doubling can be effected by eliminating the multiplier cell comprised of P-channel devices P3 and P7, the N-channel device N2 and the capacitor C4. Alternatively, effective elimination of the second multiplier cell can be realized simply by changing the connections as illustrated in FIG. 1 by connecting the dashed line connecting the negative terminal capacitor C3 and drain of P7 and disconnect at the dashed cross below the dashed line on the line connecting the drain of the device P6 to the negative terminal of the capacitor C3 and the dashed crosses at the positive and negative terminals of capacitor C4. The crosses indicate a selective open circuit while the dashed line 2 designates a selective interconnection. Thus, to create a voltage doubler, the negative terminal of the capacitor C3 is connected to the drain of the device P7 while the negative terminal of the capacitor C3 is disconnected from the node common to the drain of the device P6 and the source of the device N2. In addition, the capacitor C4 is disconnected from the circuit. Under these conditions, the devices P6, N2 and P3 do nothing useful.

The capacitor C3 is charged through the device P2 and P7 on one half cycle. The capacitor C5 is charged through the P-channel devices P4 and P8 on the same half cycle. On the next half cycle, the positive side of the capacitor C3 is driven to $-1.5$ volts by the device N1. This drives the negative side of the capacitor C3 to $-3.0$ volts. As a result, the device N3 turns on to drive the positive of the capacitor C5 to $-3.0$ volts putting its negative side at $-4.5$ volts. This produces gate drive for the transfer device P5 allowing charge to tranfer from capacitor C3 into the holding capacitor C6 on successive cycles until the capacitor C6 is charged to $-3.0$ volts.

It is to be noted that when constructing the device of the present invention, the bodies of the P-channel devices are the substrate which is tied to ground. The bodies of the N-channel devices N2 and N3 must be tied to their respective sources in that both their sources and drains are driven more negative than the supply. The body of the device N5 must be tied to its source because it too is driven more negative than the supply.

Returning to the multiplier cells illustrated in FIG. 1, it can be seen that the P-channel devices P2, P3, and P4 which connect to the positive reference level $V_{S+}$ look to have their sources tied to $V_{S+}$ and their drains tied to the capacitor C3, C4 and C5, respectively, at all times. The reason for this is based upon the definition of the source and drain of field effect devices. For a P-type device, the source is defined as that electrode of the first and second electrodes defining the conduction path having the highest potential applied thereto. For an N-type device, the source electrode is defined as the electrode of the first and second electrodes defining the conduction path having the lowest potential applied thereto. Since the positive reference potential $V_{S+}$ is always more positive than the potential on the positive plate of the capacitor associated with the Ptype device, its source will always be tied to $V_{S+}$. However, the P-channel devices P6, P7 and P8 connecting to the negative reference level $V_{S-}$ look to have their sources connected to their associated cell capacitor C3, C4 and C5, respectively, during the charging of the capacitor and to the reference level $V_{S-}$ while the capacitors are connected in series. The reason for this is that while the capacitors are connected in parallel, the negative plates of the capacitances C3, C4 and C5 are always more positive than the level $V_{S-}$. However, when the capacitors are connected in series, the negative plates of the capacitors C3, C4 and C5 will become more negative than the level $V_{S-}$ thus causing the sources of the devices P6, P7 and P8 to connect to the negative reference level $V_{S-}$.

According to the present invention, N-channel devices are not used to connect the capacitors C3, C4 and C5 to the negative reference level $V_{S-}$ because their sources would connect to $V_{S-}$ during charging and to the capacitors during series connection time. The gate drive signal is referenced to the level $V_{S-}$ so that N-channel devices would turn back on and discharge the capacitors C3, C4 and C5 when the series connection was made. The N-channel devices N1, N2 and N3 work well for the series switching because they can be turned off during charging by a gate signal referenced to the level $V_{S-}$ and the increase in voltage for successive cells simply adds to the gate drive. As previously explained, the gate of the series switching device N2 of the second multiplier cell is connected to the level $V_{S-}$ while the gate of the N-channel device N1 of the first multiplier cell is connected to the c output from the level shifter. The circuit will also function with the gate of the device N2 connected to the c line. This is also true with respect to the device N3.

The output stage consists of a holding capacitor C6, a P-channel transfer device P5 and a modified multiplier cell including devices N3, P4 and P8 and capacitor C5 used to develop gate drive for the transfer switch P5. The capacitor C5 between the source-drain circuits of P-type devices P4 and P8 need not be very large and may be on the order of 5 or 10 pf and therefore can be formed on the intergrated circuit itself. The holding capacitor C6 is large and external to the chip as are the capacitor C3 and C4. In operation, the transfer switch P5 is turned off during charging and is turned on during the second half cycle of a complete cycle when the multiplier capacitors C3 and C4 and the power supply are connected in series. Charge is transferred into the holding capacitor C6 until its voltage equals that of the series connected multiplier capacitor and the power supply.

Figure 2:
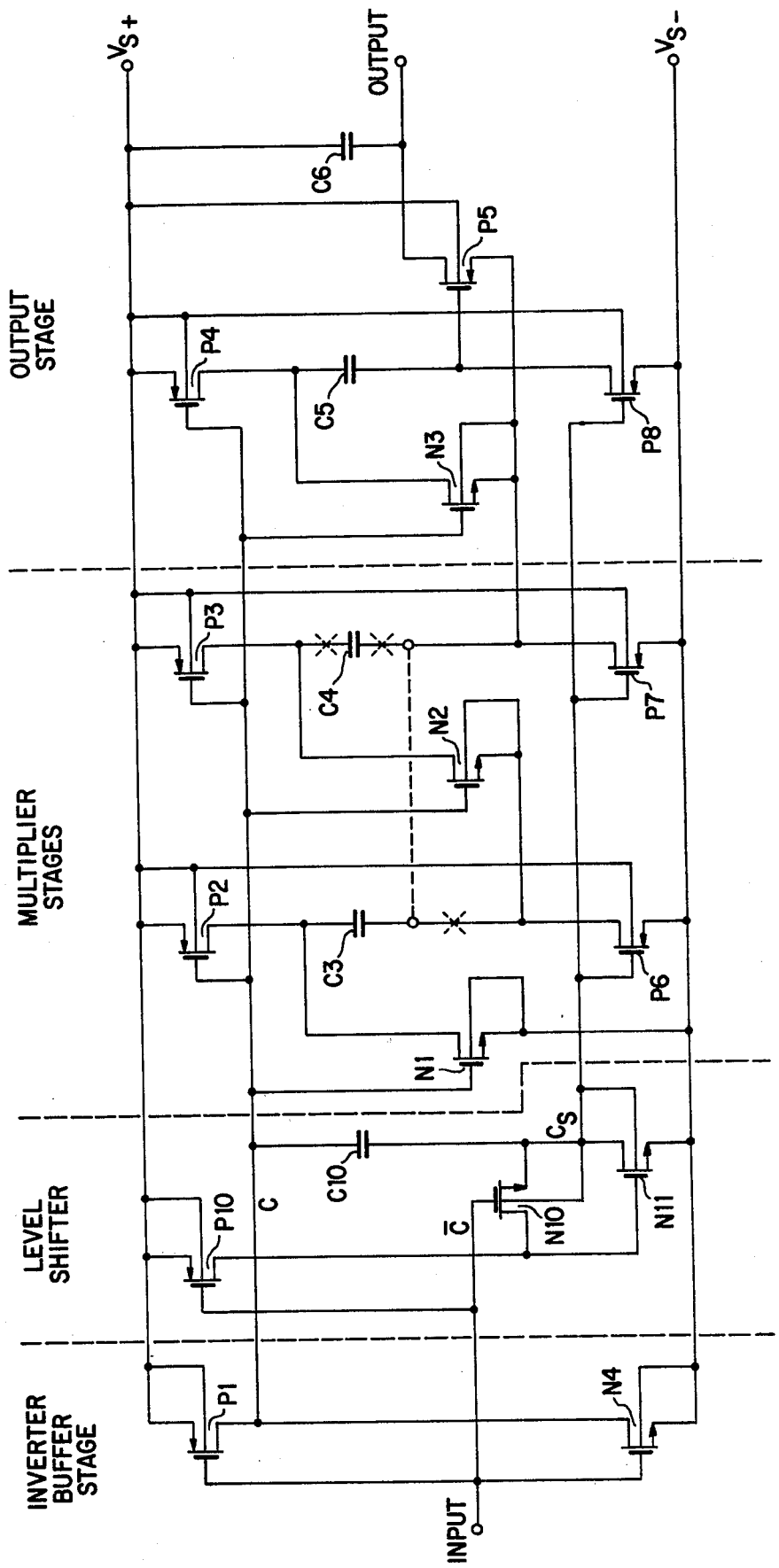
FIG. 2 is a schematic diagram of another embodiment of the voltage multiplier circuit of the present invention.

A second embodiment of the voltage multiplier of the present invention is illustrated in FIG. 2. In this embodiment, elements equivalent to elements in FIG. 1 are designated with common numerals. In the FIG. 2 embodiment, the level shifter of FIG. 1 is replaced by a level shifter which operates more reliably.

The level shifter illustrated in FIG. 2 is comprised of N-channel devices N10 and N11, a P channel device P10 and a single capacitor C10. The input to the level shifter is taken at one terminal of the capacitor C10 with the output being at the other terminal of this capacitor. The source of the device P10 is connected to the positive reference $V_{S+}$ while its drain is connected to a node common with the drain of the device N10 and the gate of the device N11. The source of the device N10 and the drain of the device N11 are connected in common with the output terminal of the level shifter. The gates of the devices P10 and N10 are connected in common and receive the complement of the output from the inverter buffer, namely, the input waveform from the counter string. The operation is well known and thus will not be explained.

In addition, the second and subsequent stages of the multiplier cells of FIG. 2 are connected in a manner such that the N-type devices have their gates coupled to the c output from the level shifter. All other aspects of the embodiment of FIG. 2 are identical to the FIG. 1 embodiment.

There has been described hereinabove, a novel voltage multiplier circuit fabricated of CMOS devices which multiplier circuit has particular application to digital watch circuits which use CMOS electronics. It is to be understood, however, that the circuit is not limited to digital watch devices and has more general application as is obvious to those with ordinary skill in the art. The voltage multiplier circuit of the present invention is economical to manufacture, reliable in operation and overcomes the aforementioned disadvantages associated with prior art CMOS voltage multipliers.

From the preceding description of the preferred embodiments, it is evident that the objects of the invention are obtained and although the invention has been described and illustrated in detail, it is to be clearly understood that the same is by way of illustration and example only and is not to be taken by way of limitation. The spirit and scope of this invention is to be limited only by the terms of the appended claims.

What is claimed:

1. A voltage multiplier circuit for producing an output which is a multiple of a supply voltage supplied thereto, comprising a first CMOS multiplier cell, said CMOS cell being comprised of:
    a pair of MOS devices of a first conductivity type;
    a single MOS device of a second conductivity type; and a capacitance means for storing voltage;
    the source-drain conduction paths of said pair of MOS devices of the first conductivity type being serially connected with said capacitance means and said supply voltage such that said capacitance means lies between the source-drain conduction paths of said pair of MOS devices;
    the source-drain conduction path of said single MOS device of the second conductivity type being connected between a first terminal of said capacitance means and said supply voltage, such that when the conduction paths of said pair of MOS devices of the first conductivity type are conductive, the capacitance means is connected in parallel with said supply voltage and when said conduction path of said single MOS device of the second conductivity type is conductive said capacitance means is serially connected to said supply voltage.

2. The voltage multiplier circuit of claim 1 further including a second CMOS multiplier cell of the same construction as said first CMOS multiplier cell, the source-drain conduction path of the single MOS device of the second conductivity type in said second multiplier cell being connected between a second terminal of the capacitance means of the first multiplier cell and a first terminal of the capacitance means of said second multiplier cell; the pair of MOS devices of said first conductivity type in said second multiplier cell being serially connected with the capacitance means of said second cell and said supply voltage, such that conduction through the conduction paths of said pair of MOS devices causes said capacitance means to be charged from said supply voltage and conduction through said single MOS device causes the capacitance means of said first and second cells to be serially connected to said supply voltage.

3. The voltage multiplier circuit of claim 1 wherein said MOS devices of a first conductivity type are comprised of P-channel MOS devices and said MOS device of a second conductivity type is comprised of an N-channel MOS device.

4. The voltage multiplier circuit of claim 1 further including means for producing an input waveform cyclically varying between upper and lower voltage limits, an inverter means for inverting said input waveform, level shifter means responsive to the output from said inverter means for clamping said inverted input wave to a selected voltage level, the output from said level shifter being connected to said first CMOS multiplier cell to control the potential at the gate of the CMOS devices of said first multiplier cell, whereby the MOS devices of the first conductivity type and the MOS device of the second conductivity type are alternately rendered conductive through their respective conduction path in dependence upon the level of said input waveform.

5. The voltage multiplier circuit of claim 4 further including an output circuit comprised of an additional multiplier cell, a transfer device comprised of an MOS device of said first conductivity type and a holding capacitance means for accumulating the sum of the voltage supply and stored in said multiplier cells.

6. A CMOS voltage multiplier comprising:
a first CMOS multiplier cell including a pair of MOS devices of a first conductivity type, a capacitance means connected in series with the source-drain conduction path of said pair of MOS devices and a supply voltage, and a single MOS device of a second conductivity type having its source-drain conduction path connected between a first terminal of said capacitance means and said supply voltage;
output capacitance means having a first terminal connected to said voltage supply;
an output MOS device having its source-drain conduction path connected between a second terminal of the capacitance means of said first multiplier cell and a second terminal of said output capacitance means;
said capacitance means of said multiplier cell being connected in parallel with said supply voltage when the pair of MOS devices are conductive and said capacitance means of said multiplier cell and said output capacitance means being connected in series with each other and said supply voltage when the single MOS device and output MOS device are conductive.

7. The multiplier of claim 6 further including means for producing an input waveform cyclically varying between upper and lower voltage limits, an inverter means for inverting said input waveform, level shifter means responsive to the output from said inverter means for clamping said inverted input wave to a selected voltage level, the output from said level shifter being connected to said first CMOS multiplier cell to control the potential at the gate of the CMOS devices of said first multiplier cell, whereby the MOS devices of the first conductivity type and the MOS device of the second conductivity type are alternately rendered conductive through their respective conduction path in dependence upon the level of said input waveform.

8. The multiplier of claim 6 further including an output multiplier cell of the same construction as said first CMOS multiplier cell, the source-drain conduction path of the single MOS device of the second conductivity type in said second cell being connected between said second terminal of the capacitance means of the first multiplier cell and a first terminal of the capacitance means of said second multiplier cell; the gate of said output MOS device being connected to a second terminal of said capacitance means of said second multiplier cell.

9. The multiplier of claim 6 wherein said pair of MOS devices are P-channel devices, said single MOS device is an N-channel device and said output MOS device is a P-channel device.

* * * * *